United States Patent [19]
Gillman et al.

[11] 3,787,240
[45] Jan. 22, 1974

[54] COMPOSITION SEPARATOR WITH MEMBRANCE EXTENSION

[75] Inventors: Leland M. Gillman, Denver; Robert E. Stark, Littleton, both of Colo.

[73] Assignee: The Gates Rubber Company, Denver, Colo.

[22] Filed: July 2, 1971

[21] Appl. No.: 159,125

[52] U.S. Cl. .................. 136/30, 136/145, 136/146
[51] Int. Cl. ........................................... H01m 3/04
[58] Field of Search 136/111, 143, 145, 146, 306 B, 136/65, 131

[56] References Cited
UNITED STATES PATENTS

| 3,438,812 | 4/1969 | Cherney et al. | 136/6 B |
|---|---|---|---|
| 3,573,106 | 3/1971 | Johnson et al. | 136/131 |
| 2,890,261 | 6/1959 | Andre | 136/145 |
| 2,968,686 | 1/1961 | Duddy | 136/146 |
| 2,655,552 | 10/1953 | Fuller et al. | 136/145 |
| 2,994,728 | 8/1961 | Herold | 136/145 |

FOREIGN PATENTS OR APPLICATIONS

| 451,628 | 8/1936 | Great Britain | 136/145 |
|---|---|---|---|

Primary Examiner—Donald L. Walton
Attorney, Agent, or Firm—Curtis H. Castleman, Jr.; Raymond Fink; H. W. Oberg, Jr.

[57] ABSTRACT

A composite multi-layer separator for use in alkaline electrochemical cells is disclosed including at least two bibulous layers sandwiching at least one semipermeable membrane. The membrane layer marginally extends beyond at least one of the adjacent bibulous layers at each point along the margin of the composite separator. Mechanical strength and ease of handling are supplied to the separator membrane by providing marginally extending supporting means along the edges of the bibulous layer(s). The separator layers may also be laminated together for further mechanical integrity.

These separators find use in a variety of alkaline galvanic cells, particularly in rechargeable cells such as nickel-cadmium, nickel-zinc, silver-zinc, manganese dioxide-zinc, and similar cells.

19 Claims, 6 Drawing Figures

PATENTED JAN 22 1974　　3,787,240

MEMBRANE LAYERS

INVENTORS
L.M. GILLMAN
R.E. STARK

COMPOSITION SEPARATOR WITH MEMBRANCE EXTENSION

BACKGROUND OF THE INVENTION

This invention relates to separators for use in alkaline electrochemical systems, in particular, for use in electrochemical cells having electrode systems such as nickel-cadmium, nickel-zinc, silver-zinc, and manganese dioxide-zinc, in which the separator must be highly resistant to physical and chemical influences within the cell.

It has been a common practice in manufacturing secondary alkaline cells to employ inter-electrode separators containing a plurality of layers, at least one of which is made of a membranous material such as regenerated cellulose. This membrane layer must be compatible with the alkaline electrolyte within the cell, be sufficiently permeable to allow passage of electrolyte ions, yet prevent metallic conduction therethrough. Such membranous materials are particularly useful in attenuating the growth of zinc dendrites in alkaline rechargeable cells having zinc as the active material for the negative electrode. These dendrites or "trees" are produced at and propagate from the zinc electrode during charge, and eventually produces tree-like conductive branches which, if not stopped, extend to the cathode, short out the cell and thus seriously reduce its useful life.

While the aforementioned membrane-containing separator has represented quite an advance in the art, it has also suffered from at least one serious drawback. Namely, these dendritic projections have had the uncanny ability to bridge the interelectrode gap by growing around or over the marginal portions of the separator, thus detouring around the barrier provided by the semi-permeable membrane. One attempt to solve this problem has been to extend the entire composite separator beyond the electrode edges to form a separator overhang, such as described in U.S. Pat. No. 2,994,728 to Herold. Unfortunately, the dendrites are still able to project through the separator layer adjacent to the anode, circumvent the edge of the membrane layer and then project through the remaining separator layer to meet the cathode, forming the undesirable short circuit.

Another attempted solution has been to make the membrane layer(s) slightly wider then the contiguous bibulous layers, thereby providing a membrane overhang. While this method has been effective in minimizing the chance that dendritic growths will find easy access to the cathode, the fragility of the membrane and the difficulty with which it is handled and assembled has prevented the method from becoming fully effective. For instance, during initial handling the membranous material is easily creased, curls readily upon slight changes in humidity and may be punctured or other discontinuities or weak spots created. The occurrence of such weak spots and discontinuities often severly hinders cell operation. It is important that the separator material be uniform throughout its surface and devoid of any such punctures, creases or any of the other discontinuities which have been found to be extremely conducive to zinc dendritic growth.

It is a primary object of this invention to produce a multi-layer separator containing at least one membranous layer sandwiched between contiguous bibulous layers, the composite separator provided with membrane extension or overhang together with mechanical support for strength and protection.

It is a further object of this invention to provide a separator which is sufficiently permeable to allow passage of electrolyte ions yet blocks crystalline projections propagated from the electrodes.

It is still another object to provide a separator whose components may be easily guided in the case where the composite separator is to be wound with adjacent electrodes into a spiral jelly-roll or other configuration.

These and other objects are met and the disadvantages of the prior art solved by employing the separator and its method of construction according to the present invention as described herein.

SUMMARY OF THE INVENTION

Briefly described, the composite separator of the invention includes at least one semi-permeable membranous layer sandwiched between a total of at least two bibulous layers highly retentive of electrolyte. At least a portion of the outer edge of the membranous layer extends beyond the contiguous outer bibulous edge portion of at least one of the adjacent bibulous layers. In turn, the marginal portion of the bibulous layers adjacent the membrane are provided with means for mechanically supporting the extended portion of the membranous layer. In one embodiment of the invention, the mechanically supported membrane overhang is provided by a membranous layer sandwiched by a pair of bibulous layers having marginally spaced projecting tabs which are staggered so as to provide mechanical support to the membrane, yet are not aligned on opposite sides of the membrane so as to promote dendritic growth therethrough.

In another embodiment, the membrane overhang beyond the bibulous edge can effectively be made by rendering the marginal extremity of at least a portion of the bibulous layers hydrophobic to eliminate electrolyte wetting at this critical marginal portion of the composite separator. In this embodiment, the bibulous separator and included membrane may be of the same shape and dimensions to allow ease of handling. Further ease in handling may be provided in either of the above embodiments by laminating the composite into an integral structure.

These separators have particular utility as interelectrode separators where resistance to alkaline electrolyte, oxidation, dendrite growth and other degrading cell environmental factors are required. In addition to promoting cell cycle life, the separators are easily handled and guided to be formed into a desired configuration.

BRIEF DESCRIPTION OF THE DRAWINGS

The invention will be more readily understood by reference to the accompanying drawings, in which like numerals designate like parts in the several figures, and wherein.

PREFERRED EMBODIMENTS OF THE INVENTION

1. Bibulous layers

Figure 1:
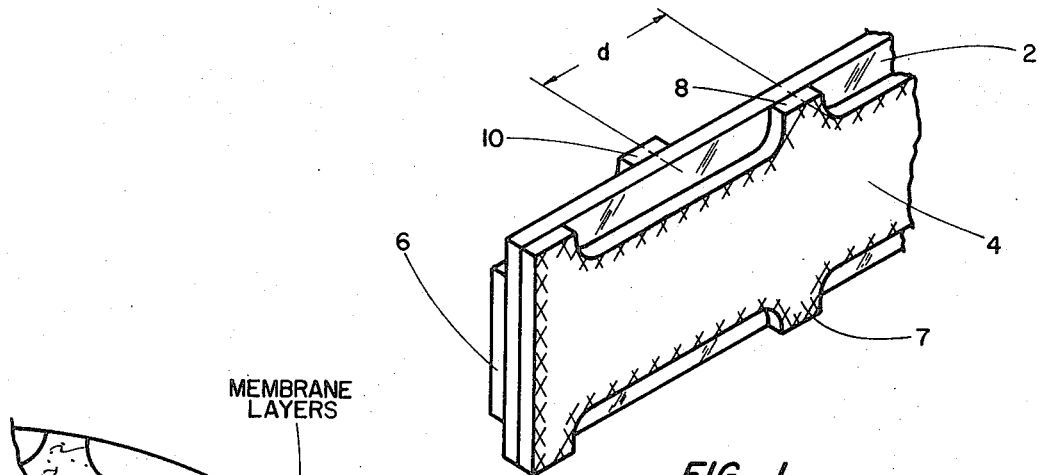
FIG. 1 is a truncated perspective view of the tab embodiment of the separator of the present invention.

Any of a number of commonly employed constructions used in conventional alkaline cells may be employed, with certain limitations. Generally, these layers are bibulous in nature, highly retentive of the electrolyte employed, resistant to oxidation within the cell and mechanically strong. Importantly, these layers must be compatible with the electrolyte used, e.g., potassium hydroxide or other alkali metal hydroxides.

Useful bibulous materials include bonded or nonbonded natural or synthetic cellulosic materials exemplified by rayon, cotton, paper materials such as porous and microporous filter papers, cellulosic esters such as cellulose acetate, etc. Examples of useful non-cellulosic materials include pressed styrene fibers, nylon, a hydrophilic nylon such as Pellon a registered trademark of the Pellon Corporation), glass fiber, polyethylene, polytetrafluoroethylne (Teflon), acrylics such as Orlon and Acrylan, polyacrylonitrile, and polyesters such as Dacron. Particularly preferred separators for prevention of dendritic growth are cotton cellulosic materials. These materials, as distinguished from conventional alkaline separators, have a degree of polymerization of preferably at least about 3,500, and more preferably at least about 7,500. By degree of polymerization is meant the average number of anhydroglucose units per molecule. (See *High Polymers*, V.5, "Cellulose and Cellulose derivatives," Interscience Publishers, 1954.)

For most purposes, it is sufficient and preferred to employ only two bibulous layers, i.e., one each contiguous to the opposite polarity electrode and both sandwiching one or more included membrane. However, a greater number of bibulous layers may be utilized, which in turn may themselves sandwich additional membranous layers, if desired.

2. Semi-Permeable membrane

Various conventional membranes may be utilized. Typically, the membrane or barrier film is a homopolymeric or copolymeric film formed from thermoplastic materials, exemplified by polyvinyl alcohol, polyvinyl chloride, polyethylene, polyvinyl acetate, cellulosic materials, polyvinyl butyral, polystyrene and various forms of nylon. Regenerated cellulose, e.g., cellophane, is generally one preferred material. Certain membranes are not naturally permeable in film form, but may be made so, as by incorporating a soluble salt or a plasticizer which can be subsequently leached out of the film. For instance, in order to make porous films of either ethyl cellulose or polystyrene which are not naturally permeable in film form, inorganic sulfates such as potassium sulfate may be incorporated in the film as the salts may readily be leached out of the film. Other conventional membranes may be employed.

3. Gelling agents

It is an alternative feature of this invention to form a separator of excellent mechanical integrity by laminating together the membrane with its adjacent bibulous layers to form an integral laminated composite. Alternatively, the semi-permeable membrane can be bonded to just one of the adjacent bibulous layers, which would also ease handling of the separator and minimize the amount of gelling agent required.

The gel layer may be applied to either or both of the bibulous layers by any conventional means, such as by spraying, brush-painting, dip-coating, knife-coating, roll coating with a gluing machine, calendering, or by extrusion coating. Normally the formulation is prepared by dispersing the gelling agent within a suitable solvent. After setting up, the coating of the gelling agent will serve the dual purpose of providing a barrier film or semi-permeable membrane itself, as well as a binding agent to render mechanical integrity and protection to the entire separator. In general, the gelling agent must be compatible with and substantially insoluble in alkaline electrolyte within the cell, retentive of electrolyte, resistant to oxidation, and capable of adhering to the aforementioned bibulous layers and the semi-permeable membrane. Preferred gelling agents of the present invention include high molecular weight, hydrophilic polymers which readily form gels. Examples of suitable gelling agents useful according to the invention include cellulose esters, exemplified by cellulose acetate; mixed cellulose esters, exemplified by cellulose acetate propionate; carboxymethylcellulose and its salts, preferably its alkali metal salts; cellulose ethers exemplified by lower alkyl ethers, including methyl cellulose and ethyl cellulose and carbocyclic ethers including benzyl ethers; other cellulosic compounds exemplified by hydroxypropylmethyl-cellulose; vinyl esters exemplified by vinyl acetate and its copolymers; salts of alginic acid, preferably alkali metal salts; additional miscellaneous compounds exemplified by rubber latex resins, silicates, ammonium lignosulfonate containing wood sugars, starch, hydrated Fuller's earth, ovalbumin, guargum, polyvinyl alcohol, polyethylene oxide and polyacrylic acid. Additional battery membrane-like separator materials which have the required gelling and compatibility characteristics are also useful, will be appreciated by those skilled in the art and are meant to be incorporated within the scope of this invention.

4. Drawings

It is a primary feature of this invention to provide a separator with membrane overhang or extension; yet this extended membrane is mechanically supported so that the composite separator has overall mechanical integrity. A finished separator may take on a variety of configurations, depending upon the geometry of the electrochemical cell. For instance, elongated strips of bibulous materials sandwiching a membrane may be spirally wound for placement into a cylindrical container. Likewise, the separators may be utilized in a flat horizontally stacking arrangement, horzontally stacked cylindrical cell, button type cell, or other configuration.

A better understanding of the invention will be had by reference to the accompanying drawings.

In FIG. 1, a long strip of thermoplastic film is employed for the membrane layer 2, and is sandwiched by two layers of cotton-based cellulosic bibulous layers 4 and 6. Each of the bibulous layers is provided with a plurality of marginally spaced extended portions, shown as tabs 8 and 10. It should be noted that the distance "$d$" between any two tabs on opposite sides of the membrane is greater than zero so that no two tabs will be in transverse alignment on opposite sides of the membrane. Such alignment, if it were to occur, would provide a continuous wetting path bridging the membrane and create a path for dendritic growth. For best mechanical support and to minimize the possibility of dendritic growth, the distance "$d$" is preferably about one-half the distance between any two consecutive tabs of one of the bibulous layers.

Figure 2:
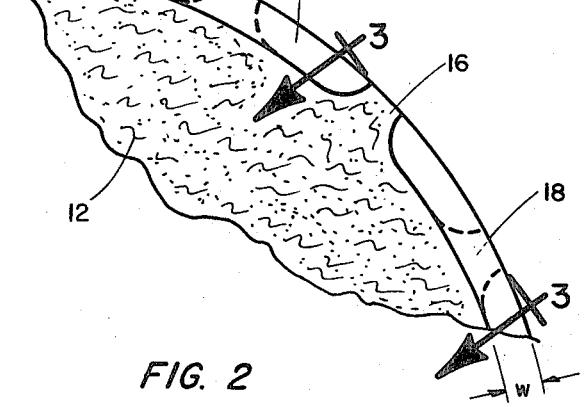
FIG. 2 is a plan view of an alternative embodiment of the tab separator for use in a cylindrical flat plate cell.
Figure 3:
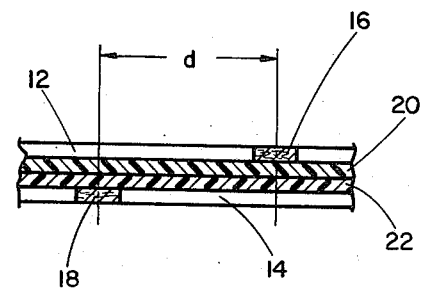
FIG. 3 is a sectional view taken along section 3—3 of FIG. 2.

In FIG. 2 and 3, a flat disc separator is shown having bibulous layers 12 and 14 with spaced circumferential extending tabs (e.g., 16 and 18) which are staggered on opposite sides of the two included membranes layers 20 and 22 by a distance $d$. The spacing between consecutive tabs may be identical or varied. The membrane overhang width in this embodiment is shown as distance $w$. The two membrane layers may be both cellophane, or one cellophane and the other a layer of a gelling agent, for instance. In the event such a gelling layer or layers is used, mechanical support will be rendered the cellophane membrane layer if only one of the bibulous layers is provided with extending tabs. It should be apparent to those skilled in the art that a variety of means may be employed to obtain the desired membrane overhang and concomitant mechanical supporting means. Thus, in FIG. 1 spaced marginal projecting tabs were employed. These tabs form a part of what may be defined as an outer bibulous edge portion illustrated by the double cross-hatched marginal path region 7 shown in FIG. 1. Extensions other than tabs may be employed as supporting means.

Figure 4:
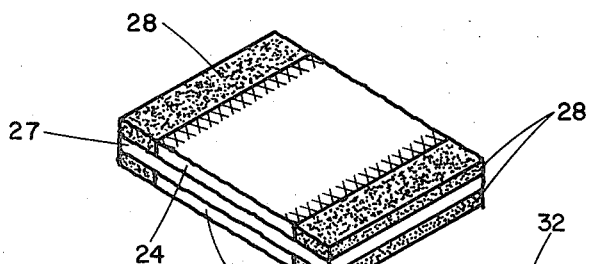
FIG. 4 depicts in perspective an alternative embodiment in which a marginal hydrophobic zone is employed.
Figure 5:
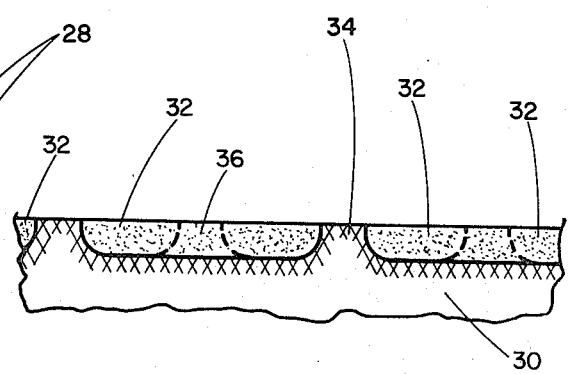
FIG. 5 is an alternative embodiment combining the hydrophobic and tab separator embodiments.

In FIG. 4, the marginal portions 28 of the bibulous layers 24 and 26 are rendered hydrophobic so that they are non-bibulous and no longer act as a wick for retention of electrolyte and dissolved zincate ions. In this manner, since the electrolyte will not be retained in the boundary portion 28, an effective membrane overhang is provided. The boundary portions 28 also serve as a mechanical support for the membrane 27. Alternatively, in FIG. 5 only a portion 32 of the margin of bibulous layer 30 is rendered hydrophobic. The oppositely aligned bibulous layer (not shown) will carry a margin with hydrophobic regions staggered from that of bibulous layer 30 so that no two bibulous extensions 34 and 36 (shown as dotted lines) exactly align on opposite sides of the included membrane.

Figure 6:
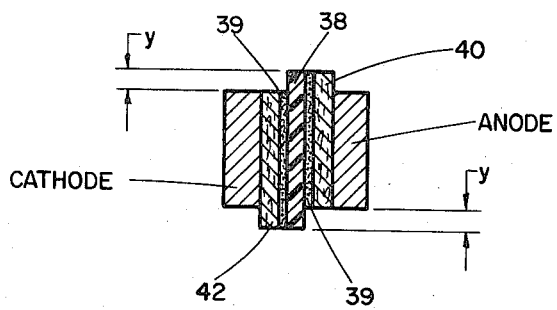
FIG. 6 is a cross-sectional view of a cathode, anode, and an embodiment of the separator of the present invention.

An additional alternative is shown in FIG. 6. A membrane overhang of width $y$ is provided at both the top and bottom of the separator consisting of membranous layer 38 sandwiched by alternately offset bibulous layers 40 and 42. The separator is laminated together with two layers 39 of a gelling agent. The composite separator is shown confined by an adjacent anode (e.g., zinc) and cathode (e.g., nickel).

5. Modifications of the invention

It should be understood that the invention is capable of a variety of modifications and variations which will be made apparent to those skilled in the art by a reading of the specification and which are to be included in the scope of the claims hereto.

What is claimed is:

1. A composite separator for use in an alkaline electrochemical cell comprising:

at least one semi-permeable membranous layer having an outer edge;

at least two bibulous layers contiguous to and sandwiching said membranous layer to form a composite separator;

said outer edge of said membrane extending beyond at least one of the adjacent bibulous layers along the margin of the composite separator;

means for supporting the extended outer edge of the semi-permeable membranous layer, said means carried along the margin of at least one of the bibulous layers, but in no event may there be supporting means carried by both bibulous layers which are in transverse alignment on opposite sides of the included membranous layer.

2. The separator of claim 1 wherein the composite comprises bibulous layers of natural or synthetic cellulosic material sandwiching a film of regenerated cellulose.

3. The separator of claim 1 wherein the bibulous layers are selected from the group consisting of pressed styrene fibers, nylon, glass fiber, polyethylene, polytetrafluoroethylene, acrylics, polyesters and copolymers thereof.

4. The separator of claim 1 wherein the semi-permeable membranous layer is cellophane.

5. The separator of claim 1 wherein at least a portion of the marginal extremity of the bibulous layers is rendered hydrophobic to prevent retention of electrolyte and subsequent dendrite propagation.

6. The separator of claim 5 wherein the marginal extremity of the bibulous layers extends to said outer edge of the membranous layer.

7. The separator of claim 5 wherein substantially the entire marginal extremity of either or both of the bibulous layers is rendered hydrophobic for a sufficient distance away from the extremity to provide and to support the necessary membrane extension.

8. The separator of claim 1 wherein the composite is formed by laminating together the membranous layer with each of the adjacent bibulous layers.

9. The separator of claim 8 wherein lamination is effected by applying to the bibulous layers a coating of a gelling agent, and then compressing together the bibulous layers with the included membranous layer.

10. A zinc anode-containing electrochemical cell having the dendrite-resistant separator of claim 1.

11. The composite separator of claim 1 wherein the membranous layer is laminated to at least one of its contiguous bibulous layers with a hydrophilic polymeric gelling agent so as to form a support therefor.

12. A composite separator for use in an alkaline electrochemical cell comprising:

a. at least one semi-permeable membranous layer having an outer edge;

b. at least two bibulous layers contiguous to and sandwiching said membranous layer to form a composite separator; at least a portion of the outer edge of said membranous layer extending beyond the contiguous outer bibulous edge portion of at least one of said bibulous layers; the marginal portion of said bibulous layers provided with means for supporting said extended membranous layer comprising integral extended portions of the bibulous layers so staggered that no two extended portions are exactly aligned on opposite sides of the included membranous layer.

13. The separator of claim 12 wherein the extended portions of the bibulous layers are furnished by marginally spaced projecting tabs.

14. A composite separator for use in an alkaline electrochemical cell comprising:
   a. at least one semi-permeable membranous layer having an outer edge;
   b. at least two bibulous layers contiguous to and sandwiching said membranous layer to form a composite separator;
   said bibulous layers having marginal extremity portions extending to and being substantially co-extensive with said outer edge of the membranous layer, and wherein a portion of said marginal extremity portions of the bibulous layers is hydrophobic and remaining portions are non-hydrophobic in nature;
   said non-hydrophobic portions of the bibulous layers being staggered to preclude exact alignment on opposite sides of the included membranous layer.

15. A composite separator for use in an alkaline electrochemical cell comprising:
   a. at least one semi-permeable menbranous layer having an outer edge;
   b. at least two bibulous layers contiguous to and sandwiching said membranous layer to form a composite separator;
   at least a portion of the outer edge of said membranous layer extending beyond the contiguous outer bibulous edge portion of at least one of said bibulous layers; the marginal portion of said bibulous layers provided with means for supporting said extended membranous layer carried by said bibulous layers and comprising extensions so staggered that no two extensions are exactly aligned on opposite sides of the included membranous layer.

16. In an alkaline electrochemical cell having a cathode and an anode spaced apart by an included composite dendrite resistant separator, said separator comprising:
   at least one semi-permeable membranous layer having an outer edge;
   at least two bibulous layers contiguous to and sandwiching said membranous layer to form the composite separator;
   said anode and cathode respectively defined by marginal extremities, said outer edge of said membranous layer extending beyond the marginal extremities of said anode and cathode;
   one and only one of said bibulous layers along its outer edge portion being contiguous to and substantially co-extensive with said semi-permeable membranous layer along a first portion of the outer edge of the membranous layer, while the other of said bibulous layers is substantially co-extensive with the outer edge of said semi-permeable membranous layer along a second portion of the outer edge of the membranous layer; and
   said membranous layer laminated to each of its contiguous bibulous layers with a hydrophilic polymeric gelling agent which forms support means along the entire surface of said membranous layer.

17. A composite separator for use in an alkaline electrochemical cell comprising:
   at least one semi-permeable membranous layer having an outer edge;
   at least two bibulous layers contiguous to and
   means for supporting at least a portion of the extended outer edge of the semi-permeable, membranous layer, said means is provided by an integral extension of only one of said bibulous layers.

* * * * *

UNITED STATES PATENT OFFICE

CERTIFICATE OF CORRECTION

Patent No. 3,787,240        Issued January 22, 1974

Leland M. Gillman, et al

It is certified that error appears in the above-identified patent and that said Letters Patent is hereby corrected as shown below:

In the title, "Composition" should properly read -- Composite -- and "Membrance" should properly read -- Membrane --.

Signed and sealed this 21st day of May 1974.

(SEAL)
Attest:

EDWARD M. FLETCHER, JR.        C. MARSHALL DANN
Attesting Officer                Commissioner of Patents